(12) United States Patent
Morgan et al.

(10) Patent No.: US 12,711,285 B2
(45) Date of Patent: Aug. 18, 2026

(54) SMART CART SECURITY WITH AUDITING

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Jay Arcement, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 17 days.

(21) Appl. No.: 19/002,240

(22) Filed: Dec. 26, 2024

(65) Prior Publication Data

US 2026/0187293 A1 Jul. 2, 2026

(51) Int. Cl.

| | |
|---|---|
| ***G06F 21/88*** | (2013.01) |
| ***G06Q 20/12*** | (2012.01) |
| ***G06Q 20/18*** | (2012.01) |
| ***G06Q 20/20*** | (2012.01) |
| ***G06Q 20/40*** | (2012.01) |
| ***G06Q 30/0601*** | (2023.01) |
| ***G06V 10/70*** | (2022.01) |
| ***G06V 20/52*** | (2022.01) |
| ***H04W 12/12*** | (2021.01) |
| ***H04W 12/126*** | (2021.01) |

(52) U.S. Cl.

CPC ............ *G06F 21/88* (2013.01); *G06Q 20/12* (2013.01); *G06Q 20/18* (2013.01); *G06Q 20/208* (2013.01); *G06Q 20/4016* (2013.01); *G06Q 30/0641* (2013.01); *G06V 10/70* (2022.01); *G06V 20/52* (2022.01); *H04W 12/12* (2013.01); *H04W 12/126* (2021.01)

(58) Field of Classification Search

CPC ...... G06Q 20/12; G06Q 20/18; G06Q 20/208; G06Q 20/4016; G06Q 30/0641; G06F 21/88; G06V 10/70; G06V 20/52; H04W 12/12; H04W 12/126

USPC .......................................................... 705/75

See application file for complete search history.

(56) References Cited

U.S. PATENT DOCUMENTS

| | | | | |
|---|---|---|---|---|
| 11,741,447 | B1 * | 8/2023 | Matheson | B62B 3/1408 705/21 |
| 12,084,104 | B1 * | 9/2024 | Alameh | G06Q 10/087 |
| 2016/0379297 | A1 * | 12/2016 | Aspholm | G06K 7/10554 705/26.8 |
| 2021/0287013 | A1 * | 9/2021 | Carter | G06N 3/0464 |
| 2022/0180277 | A1 * | 6/2022 | Konishi | G01C 21/20 |

(Continued)

*Primary Examiner* — Wodajo Getachew

(74) *Attorney, Agent, or Firm* — Schwegman Lundberg & Woessner, P.A.

(57) ABSTRACT

Methods and a system for automated smart cart security and auditing are provided. A cart includes one or more cameras mounted thereon to monitor items placed in the cart. The system performs local item recognition on the items placed in the cart by a mobile shopping device, focusing particularly on high-value items to prevent shrink. When discrepancies are detected between scanned items and items placed in the cart, the system accumulates audit points based on factors including, by way of example only, customer trust level, store shrink rates, and transaction risk scores. Upon reaching configured thresholds, the system triggers automated audit interventions that must be resolved before checkouts at self-service checkout (SCO) terminals.

7 Claims, 6 Drawing Sheets

(56) References Cited

U.S. PATENT DOCUMENTS

| | | | | |
|---|---|---|---|---|
| 2023/0130735 | A1* | 4/2023 | Perrucci | G06V 20/53<br>382/103 |
| 2024/0317289 | A1* | 9/2024 | Nobuoka | G07G 1/0036 |
| 2025/0054310 | A1* | 2/2025 | Maru | G06V 20/52 |
| 2025/0140083 | A1* | 5/2025 | Nakatsukasa | G06Q 30/06 |

* cited by examiner

SMART CART SECURITY WITH AUDITING

BACKGROUND

Smart carts present significant challenges for retailers implementing self-checkout solutions. One problem is that items are frequently not scanned or mis-scanned during smart cart transactions, leading to potential shrink and loss of profits. Even small amounts of shrink can significantly impact grocery retailers' margins. The security and payment aspects of smart carts create additional complications, as there is often limited indication that a basket has been properly paid for.

Current technological approaches have various limitations—computer vision solutions struggle with lighting conditions, changing product packages, item placement in carts, and missing items; radio frequency identification (RFID) tagging for every item remains cost prohibitive; advanced scanning technologies like DIGIMARC require new packaging and have associated costs; and adding scales to every cart is expensive. The physical durability of the carts themselves presents another challenge, as they are frequently stolen, left in parking lots, and treated roughly by shoppers. Additionally, existing technologies do not appear to have comprehensive auditing systems in place for preventing loss specifically at smart carts.

DETAILED DESCRIPTION

Figure 1A:
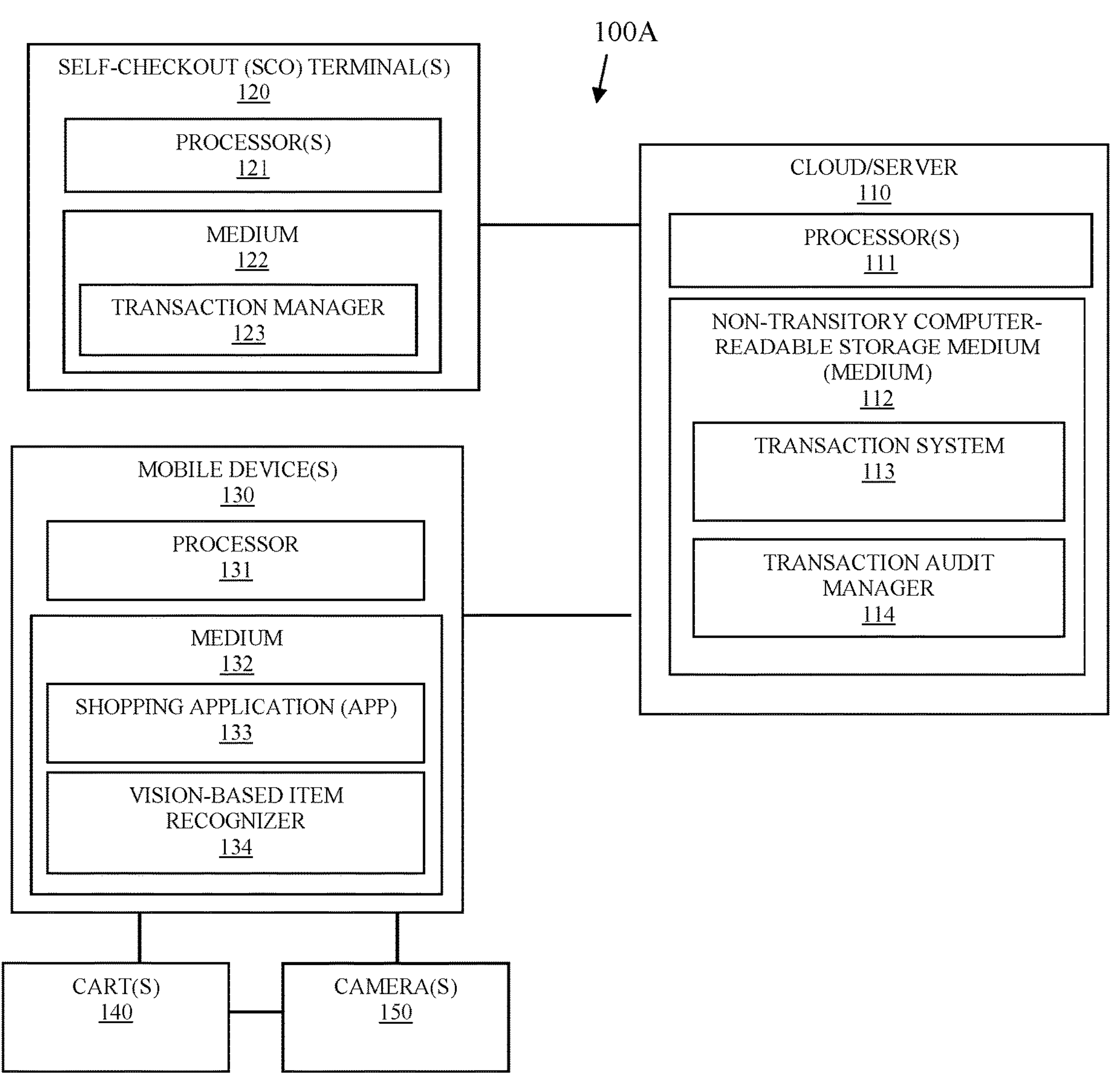
FIG. 1A is a diagram of a system for smart cart security with auditing, according to an example embodiment.

Retailers face mounting challenges with implementing smart cart solutions in their stores. While smart carts offer another avenue for self-checkout, the technology presents unique security and operational hurdles. Traditional approaches like computer vision struggle with varying lighting conditions and changing product packages, while solutions such as radio frequency identification (RFID) tagging remain cost-prohibitive to implement across an entire store inventory. The physical durability and maintenance of smart carts introduce additional complexities, as the carts are frequently subjected to rough handling, theft, and exposure to outdoor elements. Moreover, the integration of payment systems with smart carts creates vulnerability points where there is minimal verification that a basket's contents have been properly paid for.

The challenge extends beyond just accurate item detection and payment processing. When items are sold using a smart cart, there are frequent occurrences of items being either not scanned or mis-scanned. This issue becomes particularly critical for grocery retailers, where even small amounts of shrink can significantly impact profit margins. Current market solutions appear to lack comprehensive auditing capabilities specifically designed for smart cart implementations.

In an embodiment, a camera mounted near the top of the cart's basket provides continuous monitoring of items as they are placed in the cart. The techniques presented herein leverage computer vision capabilities directly on the cart, with optional bottom-of-basket monitoring through additional cameras, enabling comprehensive coverage of all items being transported.

The embodiments presented herein utilize a strategic approach to item recognition by establishing dollar thresholds for vision model training. This allows the system to focus computational resources on high-value items while maintaining cost effectiveness. When discrepancies are detected between scanned items and items placed in the cart, the system accumulates audit points based on multiple factors including store shrink rates and customer trust levels. The techniques can operate in a silent data collection mode initially, enabling self-training and minimizing setup effort.

Through integration with existing mobile shopper technology, embodiments presented herein provide a seamless and less intrusive audit process that is already familiar to many customers. The system enables store managers to identify specific locations where significant losses occur and make informed adjustments to their operations with respect to self-service transaction audits.

As used herein, the usage of the terms "cart" and "basket" may be used synonymously and interchangeably. That is, a cart can be a basket and a basket can be a cart. Furthermore, the usage of the terms "shopper," "customer," "consumer," and "user" may be used synonymously and interchangeably. This is an individual who is on a shopping journey within a store and shopping via a cart and a mobile shopping device or smart cart system.

FIG. 1A is a diagram of a system 100A for smart cart security with auditing, according to an example embodiment. Notably, the components are shown schematically in greatly simplified form, with only those components relevant to understanding of the embodiments being illustrated.

Furthermore, the various components (that are identified in system/platform 100A) are illustrated and the arrangement of the components are presented for purposes of illustration only. It is to be noted that other arrangements with more or less components are possible without departing from the teachings of providing smart cart security with auditing, presented herein and below.

System 100A includes a cloud or server 110, one or more SCO terminals 120, one or more mobile devices 130. System 100A further includes mobile devices 130 mounted or affixed to carts 140 and one or more cameras 150 mounted on the carts 140 and interfaced to the mobile devices 130.

Cloud 110 includes at least one processor 111 and a non-transitory computer-readable storage medium 112 (medium), which includes instructions for a transaction system 113 and a transaction audit manager 114. The instructions when executed by the processor 111 cause the processor 111 to perform operations discussed herein and below with respect to transaction system 113 and transaction audit manager 114.

Each SCO terminal 120 includes at least one processor 121 and a medium 122, which includes instructions for a transaction manager 123. The instructions when executed by the processor 121 cause the processor 121 to perform the operations discussed herein and below with respect to transaction manager 123.

Each mobile device 130 includes at least one processor 131 and a medium 132, which includes instructions for a shopping application (app) 133 and a vision-based item recognizer 134. The instructions when executed by the processor 131 cause the processor 131 to perform the operations discussed herein and below with respect to app 133 and vision-based item recognizer 134.

In an embodiment, mobile device 130 can include a customer's phone or a store-issued tablet device that affixes to a store cart 140 as part of a smart cart system. The mobile device 130 is operated by a customer during a shopping journey to a store. The customer interacts with a user interface (UI) of the shopping app 133 to perform in-aisle shopping during the journey, scan items using a camera associated with the mobile device 130, and place desired items picked from the store shelves and displays into the cart. The mobile device 130 is mounted on a cart 140. In an embodiment, the mobile device is a customer's phone that is inserted into a docketing station that is mounted and affixed to the cart.

Furthermore, the mobile device 130 is interfaced to one, two, or more cameras 150 mounted on the cart 140. The cameras 150 may be wireless interfaced or interfaced through a wired a universal serial bus (USB) connection to either directly connected to the mobile device 130 or indirectly connected to the mobile device through a wired connection to one more UBS ports of a docking station to which the mobile device 130 is docked.

During a shopping transaction, a customer interacts with the UI of shopping app 133 to initiate a transaction. This causes shopping app 133 to obtain a transaction identifier for the transaction from transaction system 113. As the customer, uses a camera integrated into mobile device 130 or uses a separate handheld scanner associated with mobile device 130 to scan item codes desired by the customer. The customer places the scanned items in the cart 140 while both shopping app 133 and transaction system 113 maintain a running list of items, item details, item price totals, and a running transaction price for the customer's transaction.

Furthermore, as items are placed in the cart 140, vision-based item recognizer 134 attempts to perform visual recognition on the items from a video feed provided by camera 150. The camera 150 streams the video directly to the close in proximity vision-based item recognizer 134 via a wired or wireless connection (e.g., peer-to-peer wireless connection).

In an embodiment, vision-based item recognizer 134 extracts visual features from the images of the items depicted in the video feed. The visual features are scored and used by vision-based item recognizer 134 to perform a local on-mobile-device search on item feature scores for items of a store's item catalog to find an item match for a corresponding item image. Notably, the item feature scores, item prices, and item features for items of the store's catalog are preloaded on mobile device 130 such that no network connection and no network bandwidth is needed by vision-based item recognizer to recognize a given item during the transaction. In an embodiment, the item catalog is updated each day from transaction system 113 to vision-based item recognizer 113 such as when mobile device 130 is powered on at the start of a store's business day or when mobile device 130 is powered off at an end of the store's business day.

In an embodiment, vision-based item recognizer 134 includes machine learning model (MLM) that is trained on item images and a catalog of item images to perform item recognition. Again, the catalog of item images for items of the store are locally stored on mobile device 130 and available for the vision-based item recognizer 134 to perform a localized item recognition on items depicted in the video feed during a transaction. In an embodiment, the locally on-mobile-device trained and processed MLM is convolutional neural network (CNN) algorithm, a region-based CNN (R-CNN) algorithm, you only look once (YOLO) algorithm, a single shot multibox detector (SSD) algorithm, a generative adversarial network (GAN) algorithm, an autoencoder algorithm, and/or a transformer for images (Vision Transformer) algorithm.

In an embodiment, rather than training the vision-based item recognizer 134 and/or its embedded MLM of every item of the product catalog, which can be computational and memory intensive, training is performed only on item catalog items that are above a predefined price threshold. Because the price of items are known from the item catalog, a dollar threshold can be set for items to train the vision-based item recognizer 134 and/or its embedded MLM. For example, bananas are cheap and therefore do not require item recognition since the loss associated with stolen bananas is minimal. However, filet mignon is an expensive item which would fall over a dollar threshold and as such training would be performed to recognize filet mignon placed in the cart 140 by the customer. Accuracy of item recognition remains high because filet mignon will not be confused with a cheaper cut of meat such as flank steak. By restricting item recognition training to higher price items, audit detection focuses on audit thresholds and not on recognizing the entire catalog of items for a store which is a challenge for all vision-based item recognition techniques.

Furthermore, a retailer does not have to perform new vision based work to train the vision-based item recognizer 134 and/or embedded and lightweight MLM. The training can be executed in a silent mode of operation and the dollar or high-value price threshold set for training. All of the data necessary to perform item recognition is self-contained and localized on the mobile device 130. This permits easy installation with minimal setup and limited required ongoing support. Furthermore, since customers are already familiar with mobile shopping audits, the customers are already prepared to expect and handle smart cart audits.

Each time an item is scanned by the customer for placement in cart 140, shopping app 133 triggers camera 150 to provide the video feed. The video feed includes images depicting cart areas for the items being placed in the cart 140. Vison-based item recognizer 134 attempts to identify and recognize the place item from the video feed and when a high-value item is recognized the item code for the high-value item is provided back to shopping app 133. Shopping app 133 provides the scan item code to transaction system 113 and provides the recognized item code to transaction audit manager 114. Transaction audit manager 114 first determines whether the recognized item is accounted for in the running items that were scanned by the customer during the mobile shopping based on the transaction items maintained for the transaction by transaction system 113. Assuming that the recognized item is a high-value item and is either a non-scanned item or associated with a low-value scanned item for the transaction, transaction audit manager 114 will view this situation as a significant discrepancy that exceeds an audit threshold requiring an audit of the transaction at checkout.

Notably, it is not just when discrepancies of high value that cause an audit of a transaction at checkout. That is, transaction audit manager 114 maintains audit points, an audit score, and/or risk score for a given transaction as the transaction is ongoing within the store and before checkout. The transaction audit manager 114 utilizes a variety of factors to assign audit points, generate an audit score, and/or generate risk score for the ongoing transaction. The total audit points, the audit score, and/or risk score which triggers an audit decision can be custom set or configured by a given retailer. Some example factors used for assigning points and/or generating scores include a loyalty level of a customer (e.g., high trust customer versus a low trust customer), whether a given store is considered to have low shrink or high shrink relative to a threshold value for shrink for a given retailer, low or high risk score associated with the transaction as a whole, a time of day of shopping, a location within a store where specific items are being collected, and historical shopping patterns.

In an embodiment, a store manager can assign audit points for items picked by a customer in certain areas of the store during a shopping transaction. This may be based on metrics associated with shrink that the manager utilizes to assign customer audit points for items in particular locations within the store. In a similar manner, a manager can assign audit points based on customer loyalty level, calendar day, day of week, and/or time of day based on shrink metrics for the store. Still further, a manager can assign audit points to a pattern of a shopping journey based on store shrink metrics. The assigned factors and audit points provided by the manager can be read from a settings file and processed by transaction audit manager 114 when assigning audit points, audit scores, and/or risk scores to transactions.

As the transaction audit manager 114 is maintaining audit points, audit scores, and/or risk scores for a transaction, the customer is completely unaware that is taking place during the shopping journey or transaction. That is, the transaction audit manager 114 processes transparently, seamlessly, and in the background during the shopping journey of the customer. It is only when the customer transfers the transaction to a SCO terminal 120 to review and pay for checkout of the transaction that transaction audit manager 114 intervenes when transaction audit manager 114 determines that an audit is necessary for the transaction.

When transaction audit manager 114 determines a transaction requires an attendant audit, the UI of transaction manager 123 is interrupted with a message to the customer to please wait for attendant assistance. The transaction audit manager 114 notifies transaction system 113 and/or notifies transaction manager 123 to suspend the checkout on the SCO terminal 120.

Prior to the message being displayed to the customer or as soon as the message is presented to the customer, the transaction audit manager 114 sends an audit notification to an attendant device. The notification at least identifies the SCO terminal 120 where the customer is attempting to checkout. In an embodiment, the attendant device is a management terminal that an attendant utilizes while overseeing a bank of SCO terminals during self-checkouts. In an embodiment, the attendant device is a mobile device operated by the attendant, such as a phone, a tablet, or a wearable processing device.

The attendant then goes to the SCO terminal 120 and logs in via an administrative set of credentials to override the transaction interrupt. This causes transaction manager 123 to enter an administrative audit mode. The transaction audit manager 114 identifies the specific items that triggered the audit for the attendant to check against the transaction and provides the specific items either to transaction system 113 or transaction manager 123. These specific items to check are then presented to the attendant either through the UI of the administrative audit mode for the transaction manager or presented to the attendant on an attendant's mobile device so that the customer is unaware of what is being audited. The attendant verifies the items that are to be checked and either informs the customer of the discrepancy or verifies the transaction as legitimate. Metrics for the audit and the transaction are captured and stored in transaction data store for review with other transaction audit metrics by store managers or by automated applications to identify factors associated with shrink. The manager may then change the audit points assigned to the shrink factors or create new factors in a settings file which is subsequently processed by transaction audit manager 114 for determining when to trigger an audit for a transaction.

System 100 reduces retail shrink while leveraging the existing market penetration of smart cart and shopping systems. System 100 is customizable for specific audit factors and audit point assignments to audit factors by specific retail stores based on their shrink experiences. Furthermore, system 100 reduces computation, memory, and network resources by performing localized on-mobile device item recognition for limited high-value items of a store's item catalog without compromising item recognition and audit accuracy. System 100 also captures metrics during audits of self-service transactions which provide a foundation for data insights into audit factors and each factor's weight (e.g., audit point total). The factors and corresponding weights may be assigned via a settings file such that audit determinations continue to evolve and become increasingly more accurate over time based on evolving store conditions and actual shrink experienced by specific stores.

Figure 1B:
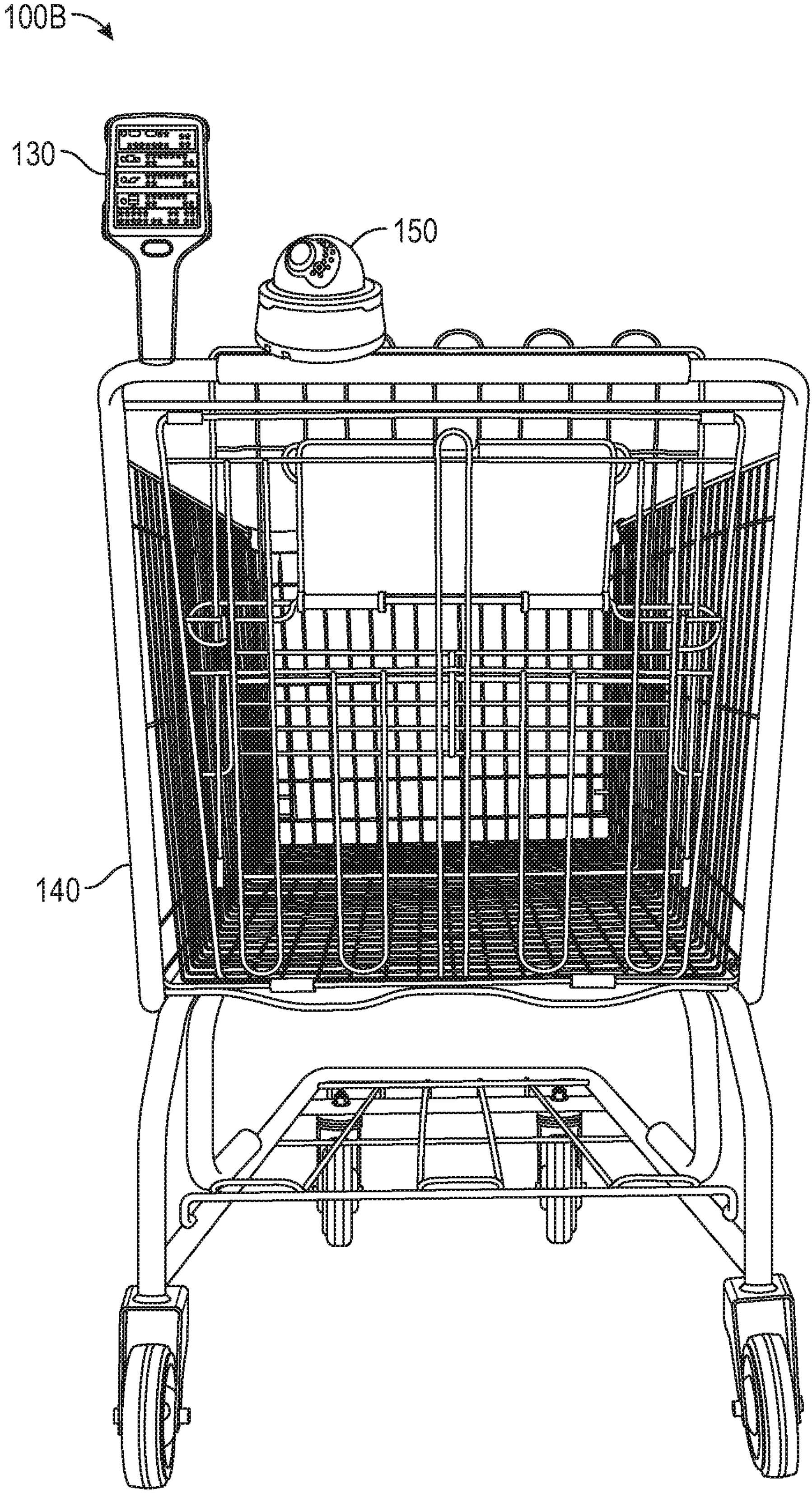
FIG. 1B is pictorial diagram depicting a smart cart portion of the system of FIG. 1A, according to an example embodiment.

FIG. 1B is pictorial diagram depicting a smart cart portion 1001B of the system of FIG. 1A, according to an example embodiment. The smart cart portion 1001B includes a cart mounted mobile device 130 and a cart mounted single camera 150. Camera 150 is focused on the interior of cart 140 and provides a video stream of images inside the cart 140.

In an embodiment, shopping app 133 triggers camera 150 to begin streaming the images depicting the interior of the cart 140 to vison-based item recognizer 134 when shopping app 133 detects that a customer has scanned an item code with the intent of placing the item associated with the item code in the cart 140. In an embodiment, the camera 150 continuously provides a live stream of the images depicting the interior of the cart to vision-based item recognizer 134 and vision-based item recognizer 134 evaluates select images from the live stream when shopping app 133 indicates the customer has scanned an item code with the intent of placing the item associated with the item code in the cart 140.

Shopping app 133 of mobile device 130 permits the customer to scan items, maintains a running basket itemization for a customer transaction, may optionally permit digital payment for concluding the transaction and performing checkout while at a SCO terminal 120, and permits the transaction to be moved to a specific SCO terminal for self-checkout. Vision-based item recognizer 134 and camera 150 confirms when items have been placed in the cart 140 if not associated with a corresponding item scan of an item by shopping app 133; facilitates identification of mis-scans by customers, learns over time, and facilitates capturing of metrics used to determine potentially malicious baskets or transactions by transaction audit manager 114.

Figure 1C:
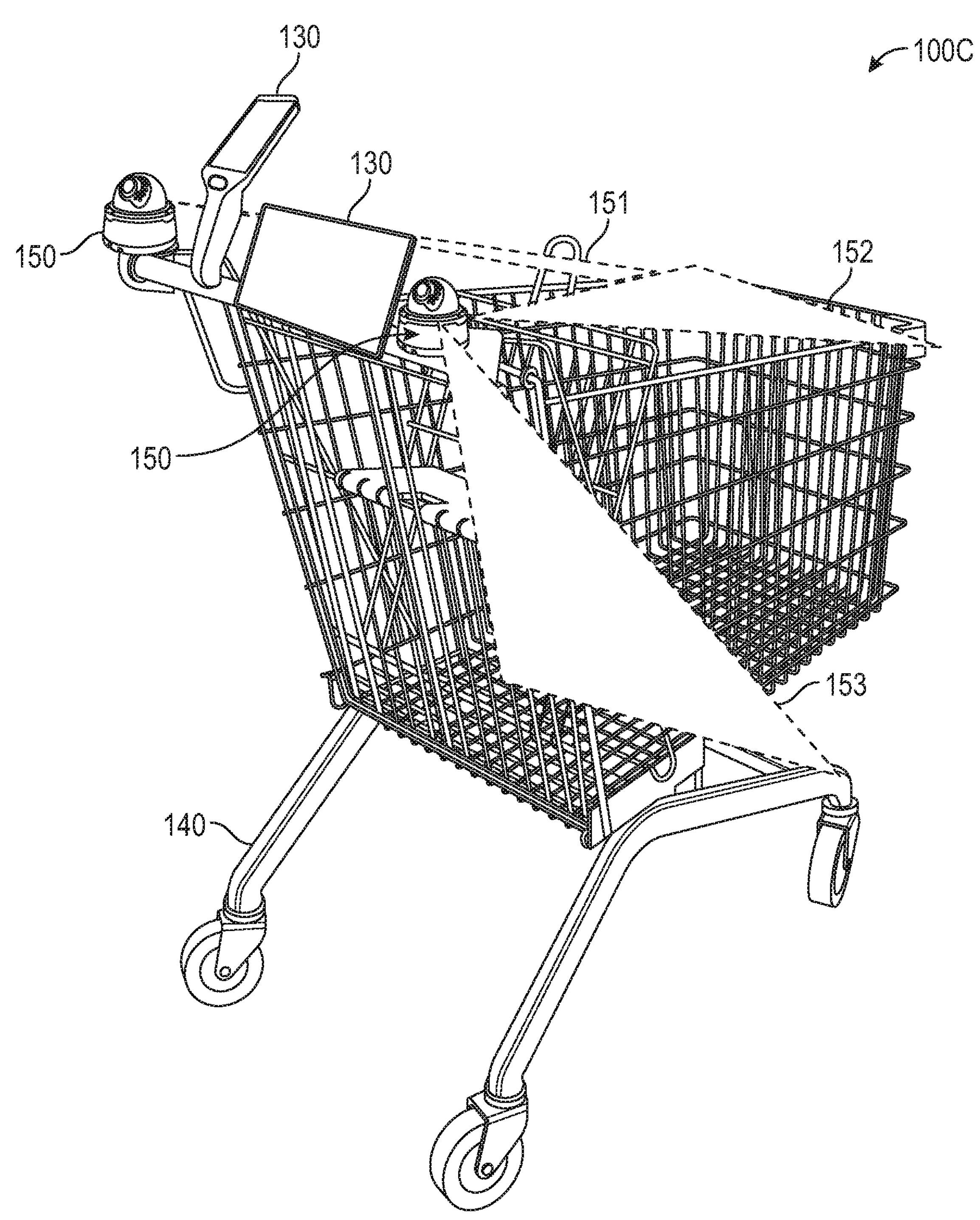
FIG. 1C is a pictorial diagram depicting a different arrangement of the smart cart portion of the system of FIG. 1A, according to an example embodiment.

FIG. 1C is a pictorial diagram depicting a different arrangement of the smart cart portion 100C of the system of FIG. 1A, according to an example embodiment. The smart cart portion 100C includes a mobile device 130 including an extended tablet based device mounted on a cart 140, a first camera 150 mounted on the cart 140, and a second camera 150 mounted on the cart 140.

The first camera 150 is the leftmost camera illustrated in FIG. 1C. The second camera 150 is the rightmost camera illustrated in FIG. 1C. The first camera 150 includes a field of vision 151 that extends to over the top and open portion of the cart 140. The second camera 150 includes a first field of vision 152 and second field of vision 153. The first field of vision 152 for the second camera 150 overlaps the field of vision 151 of the first camera 150. The second field of vision 153 for the second camera 150 is focused on the underside and/or bottom of the cart 140. The underside or bottom of the cart 140 is often where customers place heavy and/or bulky items such as bottled water, paper towels, cases of soda, etc. The two camera arrangement permits a 360 degree view of the cart 140 and provides two streams of images to the vision-based item recognizer 134 for item recognition during shopping journeys of customers within a store.

Smart cart portion 100C represents a dual zone camera coverage of cart 140. To capture images of items placed in the cart 140 and images of items placed underneath or on a bottom of the cart 140. In an embodiment, the second camera 150 is placed adjacent to the bottom of the cart 140 or placed on a side of the cart 140 so as to capture images of items placed underneath the cart 140 or a bottom of the cart 140 with better unrestricted views from that which is illustrated in FIG. 1C where the second camera 150 is mounted on a top and right side of the cart handle.

Figure 1D:
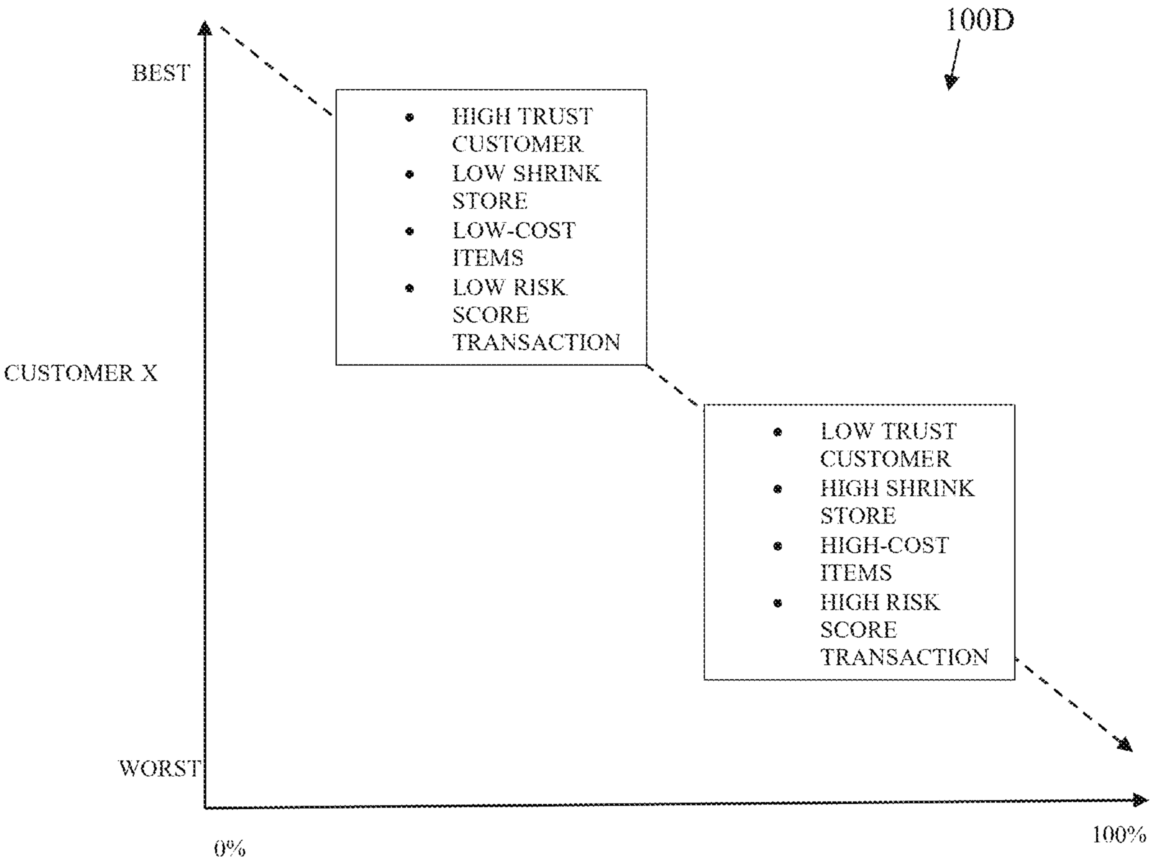
FIG. 1D is a graph depiction the relationship between factors when the system of FIG. 1A determines whether an audit is warranted during a shopping transaction, according to an example embodiment.

FIG. 1D is a graph 100D depiction the relationship between factors when the system of FIG. 1A determines whether an audit is warranted during a shopping transaction, according to an example embodiment. Graph 100D is intended to illustrate some example factors processed by transaction audit manager 114 to assign audit points to a transaction during a shopping journey. The best situation with the lowest assigned audit points occur when the customer is of high trust (e.g., a high loyalty level with a store), the store experiences low overall shrink, the transaction includes low-cost items, and the transaction as a whole is assigned a low risk score. The worst situation is exactly the opposite when the customer is of low trust (e.g., low loyalty level or not loyalty status with a store), the store experiences high overall shrink, the transaction includes high-cost items, and the transaction as a whole is assigned a high-risk score. The higher the audit point total, the more likely that transaction audit manager 114 is going to intervene during a self-checkout at a SCO terminal 120 and request an attendant audit of the transaction. The lower the audit point total, the less likely that the transaction audit manager 114 is going to intervene with an attendant requested audit of the transaction.

Figure 2:
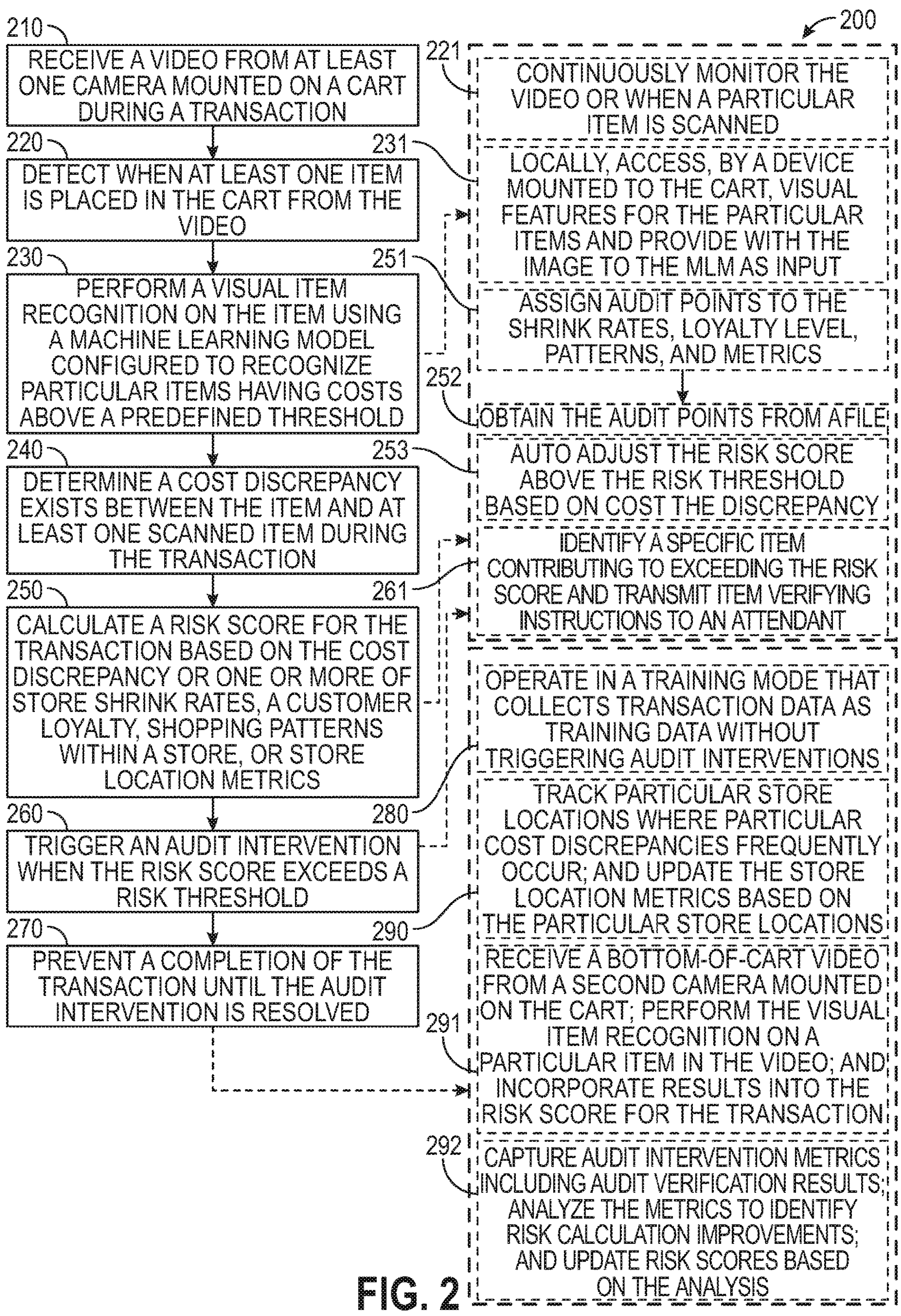
FIG. 2 is a flow diagram of a method for smart cart security with auditing, according to an example embodiment.
Figure 3:
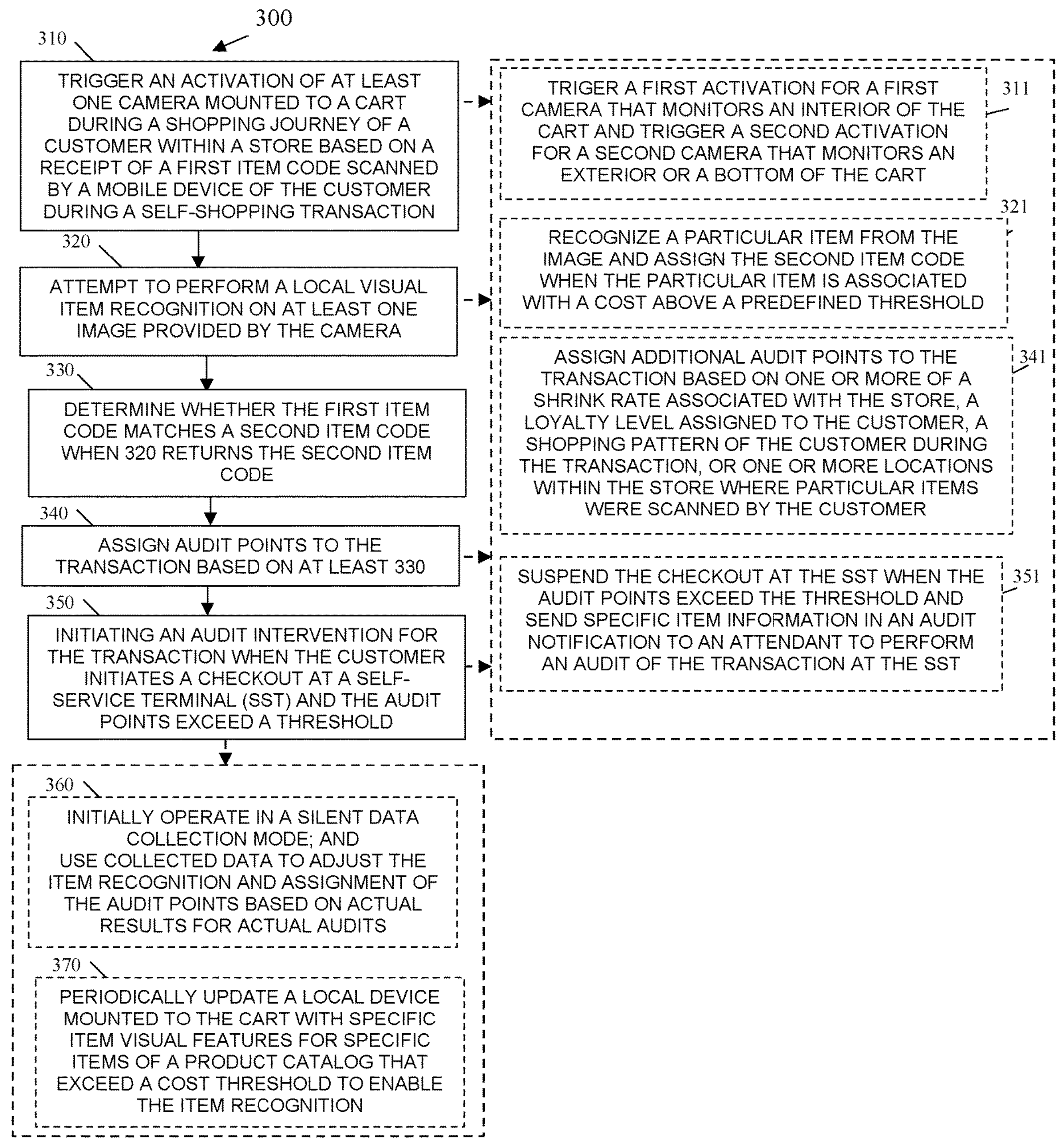
FIG. 3 is a flow diagram of another method for smart cart security with auditing, according to an example embodiment.

The above-referenced embodiments and other embodiments are now discussed within FIGS. 2-3. FIG. 2 is a flow diagram of a method 200 for smart cart security with auditing, according to an example embodiment. The software module(s) that implements the method 200 is referred to as an "audit manager." The audit manager is implemented as executable instructions programmed and residing within memory and/or a non-transitory computer-readable (processor-readable) storage medium and executed by one or more processors of one or more devices. The processor(s) of the device that executes the audit manager are specifically configured and programmed to process the audit manager. The audit manager may have access to one or more network connections during its processing. The network connections can be wired, wireless, or a combination of wired and wireless.

In an embodiment, the device that executes the audit manager is cloud 110, a store server, or a retail server. In an embodiment, the audit manager executes on a mobile device 130 and a server or cloud 110. In an embodiment, the audit manager is all or some combination of transaction system 113, transaction audit manager 114, shopping app 133, and/or vision-based item recognizer 134.

At 210, the audit manager receives a video from at least one camera mounted on a cart during a transaction. At 220, the audit manager detects when at least one item is placed in the card from the video. In an embodiment, at 221, the audit manager continuously monitors the video or monitors the video when a particular item is scanned for the transaction.

At 230, the audit manager performs a visual item recognition on the item using a MLM configured to recognize particular items having costs above a predefined threshold. In an embodiment, at 231, the audit manager locally accesses, by a device mounted to the cart, visual features for the particular items and provides the visual features and the image to the MLM as input. In an embodiment, the device is mobile device 130.

At 240, the audit manager determines a cost discrepancy exists between the item and at least one scanned item during the transaction. At 250, the audit manager calculates a risk score for the transaction based on the cost discrepancy or one or more of store shrink rates, a customer loyalty level, shopping patterns, or store location metrics.

In an embodiment, at 251, the audit manager assigns audit points to the store shrink rates, the customer loyalty level, the shopping patterns, and the store location metrics. In an embodiment of 251 and at 252, the audit manager obtains the audit points for the store shrink rates, the customer loyalty level, the shopping patterns, and the store location metrics from a settings file associated with a store. In an embodiment, at 253, the audit manager automatically adjusts the risk score to set the risk score above the risk threshold based on the cost discrepancy.

At 260, the audit manager triggers an audit intervention when the risk score exceeds a risk threshold. In an embodiment, at 261, the audit manager identifies a specific item contributing to exceeding the risk score and transmits item verifying information that includes an identification of the specific item to an attendant device or to an SST 120 where a customer is attempting to checkout for the transaction.

At 270, the audit manager prevents a completion of the transaction until the audit intervention is resolved. That is, an attendant is dispatched to the SST 120 where the customer is attempting to checkout and the attendant conducts the audit and clears the audit intervention at the SST 120 once the audit is conducted by the attendant.

In an embodiment, at 280, the audit manager operates in a training mode to collect transaction data as training data. During the training mode audit interventions are not triggered by the audit manager.

In an embodiment, at 290, the audit manager tracks particular store locations or areas within the store where particular cost discrepancies frequently occur. The audit manager updates the store location metrics based on the particular store locations and their relationships to audits and shrink rates.

In an embodiment, at 291, the audit manager receives a bottom-of-cart video from a second camera mounted on the cart. The audit manager performs the visual item recognition on a particular item depicted in the bottom-of-cart video and incorporates results from the visual item recognition into the risk score for the transaction.

In an embodiment, at 292, the audit manager captures audit intervention metrics including audit verification results. The audit manager analyzes the metrics in view of the results to identify risk calculation improvements and the audit manager updates risk scores based on the analysis.

FIG. 3 is a diagram of another method 300 for smart cart security with auditing, according to an example embodiment. The software module(s) that implements the method 300 is referred to as a "shelf-shopping auditor." The shelf-shopping auditor is implemented as executable instructions programmed and residing within memory and/or a non-transitory computer-readable (processor-readable) storage medium and executed by one or more processors of a device. The processors that execute the shelf-shopping auditor are specifically configured and programmed for processing shelf-shopping auditor. The shelf-shopping auditor may have access to one or more network connections during its processing. The network connections can be wired, wireless, or a combination of wired and wireless.

In an embodiment, the devices that execute the shelf-shopping auditor is mobile device 130 and cloud 110 or a server. In an embodiment, the shelf-shopping auditor is all or some combination of transaction system 113, transaction audit manager 114, shopping app 133, vision-based item recognizer 134, and/or method 200. The localized mobile device item recognizer presents a different and, in some ways, enhanced processing perspective from that which was discussed with method 200 of FIG. 2.

At 310, the shelf-shopping auditor triggers an activation of at least one camera 150 mounted to a cart 140 during a shopping journey of a customer within a store based on a receipt of a first item code scanned by a mobile device 130 of the customer during a self-shopping transaction. In an embodiment, at 311, the shelf-shopping auditor triggers a first activation for a first camera 150 that monitors an interior of the cart 140 and simultaneously triggers a second activation for a second camera 150 that monitors an exterior or a bottom of the cart 140.

At 320, the shelf-shopping auditor attempts to perform a local visual item recognition on at least one image provided by the camera 150. In an embodiment, at 321, the shelf-shopping auditor recognizes a particular item from the image and assigns a second item code when the particular item is associated with a cost above a predefined threshold.

At 330, the shelf-shopping auditor determines whether the first item code matches a second item code when 320 returns the second item code indicating that the local visual item recognition occurred. At 340, the shelf-shopping auditor assigns audit points to the transaction based at least on 330. In an embodiment, at 341, the shelf-shopping auditor assigns additional audit points to the self-shopping transaction based on one or more of a shrink rate associated with the store, a loyalty level assigned to the customer, a shopping pattern of the customer during the self-shopping transaction, or one or more locations within the store where particular items for the self-shopping transaction were scanned by the customer.

At 350, the shelf-shopping auditor triggers an audit intervention for the self-shopping transaction when the customer initiates a checkout at an SST 120 and the audit points exceed a threshold. In an embodiment, at 350, the shelf-shopping auditor suspends the checkout at the SST 120 when the audit points exceed the threshold and the shelf-shopping auditor sends specific item information in an audit notification to an attendant device for an attendant to perform an audit of the self-shopping transaction at the SST 130.

In an embodiment, at 360, the shelf-shopping auditor initially operates in a silent data collection mode. The shelf-shopping auditor uses collected data during the silent data collection mode to adjust the local visual item recognition and to adjust the assignment of audit points based on actual results for actual audits performed on previous self-shopping transactions.

In an embodiment, at 370, the shelf-shopping auditor periodically updates a local device mounted to the cart with specific items of a product catalog to enable local visual item recognition on the local device. The specific items are associated with a prices that exceed a cost threshold. In an embodiment, the local device is mobile device 130.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

triggering an activation of at least one camera mounted to a cart during a shopping journey of a customer within a store based on a receipt of a first item code scanned by a mobile device of the customer during a self-shopping transaction;

attempting to perform a local visual item recognition on at least one image provided by the at least one camera;

determining whether the first item code matches a second item code when the performing returns a second item code;

assigning audit points to the self-shopping transaction based on at least the determining; and initiating an audit intervention for the self-shopping transaction when the customer initiates a checkout at a self-service terminal (SST) and the audit points exceed a threshold.

2. The method of claim 1, wherein triggering further includes triggering a first activation of a first camera that monitors an interior of the cart and triggering a second activation of a second camera that monitors an exterior or a bottom of the cart.

3. The method of claim 1, wherein attempting to perform further includes recognizing a particular item from the at least one image and assigning the second item code when the particular item is associated with a cost above a predefined threshold.

4. The method of claim 1, wherein assigning further includes assigning additional audit points to the self-shopping transaction based on one or more of a shrink rate associated with store, a loyalty level assigned to the customer, a shopping pattern of the customer during the self-shopping transaction, or one or more locations within the store where particular items were scanned by the customer.

5. The method of claim 1, wherein initiating further includes suspending the checkout at the SST when the audit points exceed the threshold and sending specific item information in an audit notification to an attendant to perform an audit of the self-shopping transaction at the SST.

6. The method of claim 1, further comprising:

initially operating in a silent data collection mode; and using collected data during the silent data collection mode to adjust the local visual item recognition and assignment of the audit points based on actual audit results for actual audits performed on previous self-shopping transactions.

7. The method of claim 1, further comprising: periodically updating a local device mounted to the cart with specific item visual features for specific items of a product catalog that exceed a cost threshold to enable the local visual item recognition.

* * * * *